Aug. 7, 1934.  R. SALZBRENNER  1,969,624
LIMIT SLIDING GAUGE
Filed Dec. 16, 1930  2 Sheets-Sheet 2

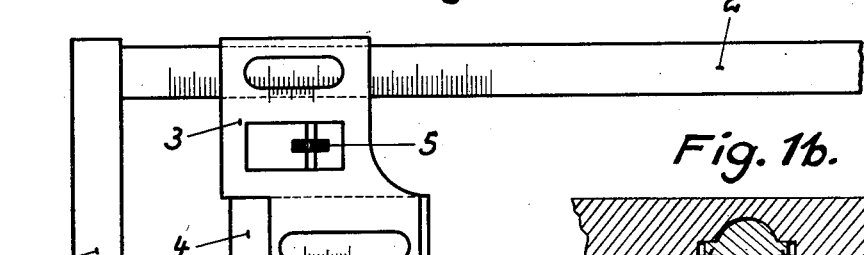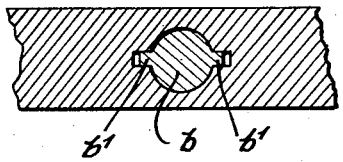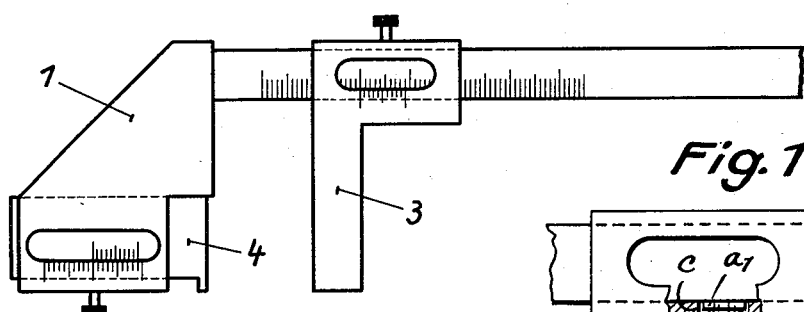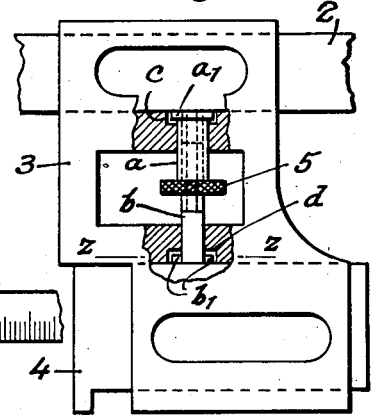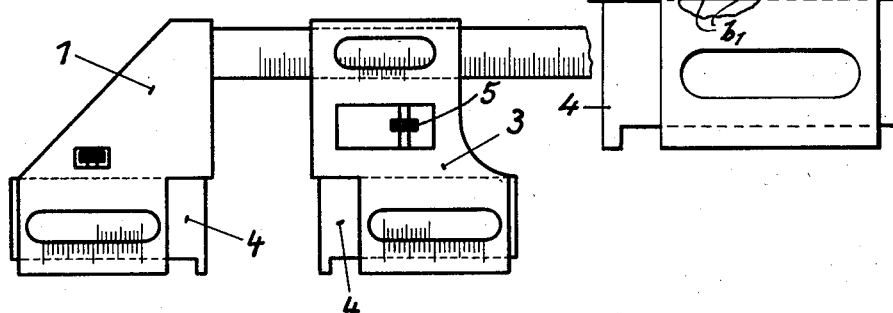

Inventor:
R. Salzbrenner
By: Marks & Clerk
Attys.

Patented Aug. 7, 1934

1,969,624

UNITED STATES PATENT OFFICE 1,969,624

LIMIT SLIDING GAUGE

Rudolf Salzbrenner, Mulheim-Ruhr, Germany

Application December 16, 1930, Serial No. 502,736
In Germany August 29, 1928

3 Claims. (Cl. 33—143)

The products of workshops of every description, more especially the products of rolling mills and other workshops for turning out finished articles, must always be tested for tolerance in cross-section and in the measurements. Apart from micrometer gauges for making extremely small measurements, use is made in these tests, firstly of the ordinary sliding gauge, and secondly of the ordinary limit gauge.

The checking of measurements in rolling mills and in many other workshops is a checking of limits, that is to say it is less a question of obtaining one single exact measurement than it is one of determining whether a measurement lies within a particular range of dimensions. Accordingly the instruments for checking measurements need in practice to combine two measurements, one corresponding to the lower limit and the other to the upper limit of tolerance.

The ordinary sliding gauges employed do not fulfil these requirements. With them one measurement only is ever possible, that is to say, the true measurement. For every single check the slide must be moved and the measurement read off. This repeated adjustment of the sliding gauge not only consumes much time, but it is a manifold source of error, such as inexactness due to bad lighting of the shop, or to fatigue on the part of the member of the staff making the check, and to general inattention of the operative.

These sources of error are eliminated by the limit gauges now generally used by reason of the fact that the limit gauges have two fixed measurements for any particular size of work, a minimum and a maximum. They have, however, the disadvantage that for each size of work a special limit gauge is necessary, as the two fixed measurements correspond only to the limits of measurement of one particular piece of work. In connection, for example, with the various measurements of work which occur in rolling mills it is necessary to have as many limit gauges as different pieces of work; this is, however, impracticable.

The limit sliding gauge according to the invention combines the advantages of the ordinary sliding gauge with those of the limit gauge while eliminating the disadvantages of both: just as with the ordinary sliding gauge, so with the gauge according to the invention, with which every single measurement can be read with exactness; but in addition it can be used for every desired measurement as a limit gauge with fixed limits of measurement adjustable for all sizes of work.

According to the invention, an additional slide is mounted in or on one of the two measuring members of the sliding gauge so as to be capable of movement along the graduated rule of the sliding gauge and secured. It will be understood that according to the invention such an additional slide can be mounted either in the fixed or in the moving measuring member.

Several examples of the sliding gauge according to the invention are illustrated in the accompanying drawings, in which;

Figure 1 is a view of one form of the limit sliding gauge having an additional slide in the movable member.

Figure 1a shows the movable member with the clamping mechanism in partial section.

Figure 1b is a cross-section along line Z—Z of Fig. 1a.

Figure 2 shows another form of the limit sliding gauge with an additional slide in the fixed member.

Figure 3 shows still another form of the sliding gauge with two additional slides one on the fixed and one on the movable member.

Figure 4:
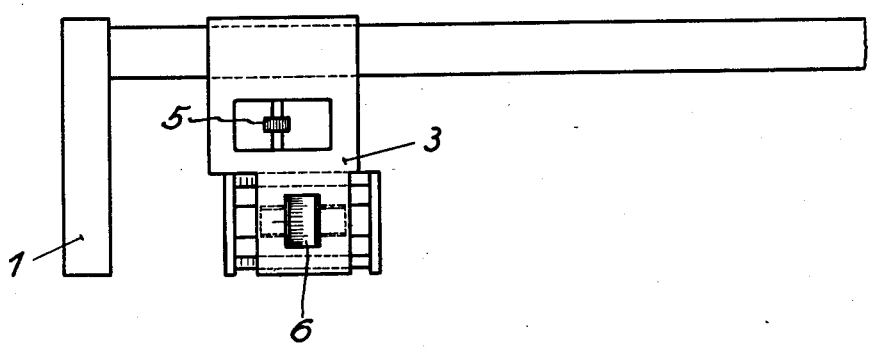
Figure 4 shows a form according to Fig. 1 but with a micrometer on the movable member.

In the figures a graduated rule 2 has a measuring member 1 fixed thereto, while a second measuring member 3 is movable along the rule and provided with a vernier applied to the scale on the rule. The members 1 and 3 are provided with co-operating measuring surfaces, that are accurately worked surfaces adapted for precisely measuring the thickness or length of a workpiece inserted between them. An additional slide 4 is inserted in an offset portion of at least one of the measuring members. This slide has also a measuring surface co-operating with that of the opposite measuring member and is provided with a vernier scale which is applied to a scale on the movable member 3. 5 is a device for setting the two slides with respect to each other and with respect to the graduated rule 2.

Figures 1a and 1b show the clamping mechanism in partial longitudinal and cross section. A tubular nut $a$ is rotatable in a bore of the main slide 3, and is longitudinally slidable for a slight extent. It is provided at its end with an adjusting disk 5, which is freely accessible in the rectangular opening of the main slide, and at its other end it has an annular connection $a_1$, which lies in an annular depression $c$ of main slide 3, and is supported against a narrow side of the measuring rod 2. The pin $b$ is screwed in the nut $a$ and its projecting end is mounted in a bore of the auxiliary slide so as to be longitudinally slidable. Rotation of the pin is prevented by projections $b_1$, which slide in longitudinal slots $d$ of the bore. If the disk 5 is rotated in the direction for clamping then the nut $a$ and the pin $b$ move away from each other, so that the connection $a_1$ of the nut is pressed against the measuring rod 2, and the free end of pin $b$ against the narrow surface of auxiliary slide 4. Thereby, on the one hand, the main slide 3 is clamped relative to the measuring rod 2, and on the other hand, the auxiliary slide 4 relative to main slide 3, so that the auxiliary slide 4 is also fixed in position relative to measuring rod 2. Rotation of the disk 5 in the opposite direction effects the simultaneous release of main slide 3 and auxiliary slide 4 from rod 2, and the auxiliary slide in turn from the main slide.

The member 3 is moved from the stationary member 1 a distance equal to the minimum admissible measurement of the work being examined; the additional slide 4 is moved to the right with respect to the member 3 a distance equal to the total admissible tolerance; thus the distance between the additional slide 4 and the fixed member 1 is equal to the maximum admissible measurement of the work being examined. By setting the two slides 3 and 4 by means of the device 5, the sliding gauge is converted into the constant limit gauge. Thus every desired space as tolerance for the most diverse measurements can be set in the simplest conceivable manner within the shortest space of time. The sliding gauge according to the invention is thus a perfect substitute for an unlimited number of fixed limit gauges.

In the construction of instrument illustrated in Figure 2, the additional slide 4, which in Figure 1 is provided in the movable member 3, is provided in the fixed member 1.

A further modification consists in providing two additional slides 4, one in the fixed member 1 and the other in the moving member 3, as shown in Figure 3.

To secure a still more exact reading than is possible with the vernier scale, the vernier scale may according to the invention be replaced by a micrometer, whereby readings can be taken down to one-hundredth of a millimetre. Here too, it is of no consequence where the micrometer is provided on the sliding gauge.

In the construction illustrated in Fig. 4 the moving member 3 carries the micrometer 6.

Figure 5:
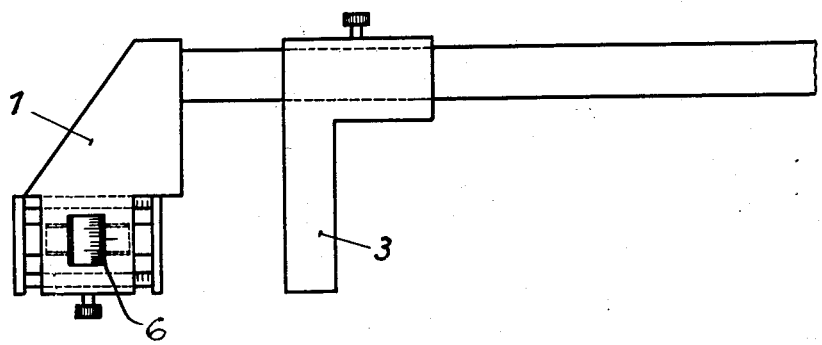
Figure 5 shows the form of Fig. 2 but with a micrometer on the fixed member.

Figure 5 illustrates a construction in which the micrometer 6 is provided in the fixed member 1.

Figure 6:
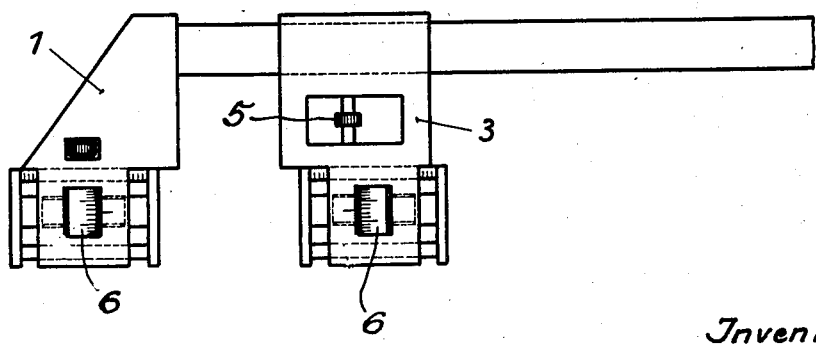
Figure 6 shows the form of Fig. 3 with a micrometer both on the fixed and the movable member.

Finally, Figure 6 illustrates a construction in which both the moving member 3 and the fixed member 1 each carries a micrometer 6.

The sliding gauge according to the invention is suitable not only for testing the products of rolling mills, but can with equal advantage be used in all other workshops particularly where use is made in mass production of products to be tested for tolerance.

I claim:

1. A gauge of the class described comprising a rule having a fixed member, a measuring member movable along the rule, a slide adjustable in the movable member, and means carried by the movable member and operable to simultaneously secure the slide in adjusted positions in said member, and the member on the rule.

2. A gauge of the class described comprising a rule having a fixed member, a slide adjustable in the fixed member, a measuring member movable along the rule, a second slide adjustable in the movable member, and means carried by the movable member and operable to simultaneously secure the second slide in adjusted positions in said member, and the member on the rule.

3. A limit sliding gauge comprising in combination a rule which is provided with a scale, a measuring member fixed on the rule having a measuring surface, a second measuring member movable along the rule and being provided with an index cooperating with the scale of the said rule, the said movable member having a measuring surface arranged opposite that of the fixed member, and a third measuring member movably arranged within at least one of the said measuring members to slide parallelly to the said rule, the said second and third measuring members being provided one with a scale and the other with an index independent of the first mentioned scale and index so that the two limit measures may be directly adjusted between the cooperating measuring surfaces of the gauge.

RUDOLF SALZBRENNER.